US 11,708,786 B2

(12) United States Patent
Inoue et al.

(10) Patent No.: US 11,708,786 B2
(45) Date of Patent: Jul. 25, 2023

(54) AUXILIARY CHAMBER TYPE INTERNAL COMBUSTION ENGINE

(71) Applicant: MITSUBISHI JIDOSHA KOGYO KABUSHIKI KAISHA, Tokyo (JP)

(72) Inventors: Yoshiya Inoue, Tokyo (JP); Dai Tanaka, Tokyo (JP); Takayuki Shirota, Tokyo (JP); Issei Nonaka, Tokyo (JP); Ryota Asakura, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 43 days.

(21) Appl. No.: 17/440,428

(22) PCT Filed: Mar. 18, 2020

(86) PCT No.: PCT/JP2020/012153
§ 371 (c)(1),
(2) Date: Sep. 17, 2021

(87) PCT Pub. No.: WO2020/196203
PCT Pub. Date: Oct. 1, 2020

(65) Prior Publication Data
US 2022/0349337 A1    Nov. 3, 2022

(30) Foreign Application Priority Data

Mar. 27, 2019   (JP) ................................. 2019-061132

(51) Int. Cl.
*F02B 19/18* (2006.01)
*F02B 19/12* (2006.01)

(52) U.S. Cl.
CPC .............. *F02B 19/18* (2013.01); *F02B 19/12* (2013.01)

(58) Field of Classification Search
CPC .................................. F02B 19/18; F02B 19/12
See application file for complete search history.

(56) References Cited

U.S. PATENT DOCUMENTS 4,029,075 A * 6/1977 Noguchi ............. F02B 19/1066
123/169 PA
2006/0130804 A1 * 6/2006 Teraji ..................... F02B 19/12
123/256

(Continued)

FOREIGN PATENT DOCUMENTS

JP       2007-113534 A        5/2007
JP       2007113534      *    5/2007

(Continued)

OTHER PUBLICATIONS

International Search Report (PCT/ISA/210) issued in PCT/JP2020/012153 dated Jun. 23, 2020.

(Continued)

*Primary Examiner* — Xiao En Mo
(74) *Attorney, Agent, or Firm* — Birch, Stewart, Kolasch & Birch, LLP

(57) ABSTRACT

An auxiliary chamber type internal combustion engine includes a main chamber, an auxiliary chamber, a plurality of connecting passages connecting the main chamber with the auxiliary chamber, and an ignition plug configured to ignite a mixture introduced into the auxiliary chamber. The plurality of connecting passages include a first connecting passage having a first injection port and a second connecting passage having a second injection port. A flame generated in the auxiliary chamber is injected into the main chamber through the first and second injection ports. The first injection port is configured such that the flame propagates along a ridge line at which the plurality of inclined surfaces of the cylinder head intersect. The second connecting passage extends in a direction oriented to the piston with respect to the first connecting passage when viewed from a direction perpendicular to the cylinder axial direction.

3 Claims, 6 Drawing Sheets

(56) References Cited

U.S. PATENT DOCUMENTS

| | | | |
|---|---|---|---|
| 2014/0261298 A1* | 9/2014 | Sasidharan | F02B 19/12 |
| | | | 123/286 |
| 2016/0053673 A1* | 2/2016 | Sotiropoulou | F02B 19/12 |
| | | | 123/260 |
| 2017/0138251 A1* | 5/2017 | Watanabe | F02B 19/1019 |
| 2020/0080467 A1* | 3/2020 | Nomura | F02B 19/1004 |

FOREIGN PATENT DOCUMENTS

| | | |
|---|---|---|
| JP | 2007-247420 A | 9/2007 |
| JP | 4561522 B2 | 10/2010 |

OTHER PUBLICATIONS

Written Opinion (PCT/ISA/237) issued in PCT/JP2020/012153 dated Jun. 23, 2020.

* cited by examiner

AUXILIARY CHAMBER TYPE INTERNAL COMBUSTION ENGINE

TECHNICAL FIELD

The present disclosure relates to an auxiliary chamber type internal combustion engine.

BACKGROUND ART

In the related art, there is proposed an auxiliary chamber type internal combustion engine including a main chamber (main combustion chamber) and an auxiliary chamber (auxiliary combustion chamber) connected to the main chamber via a connecting passage has been proposed (see, for example, JP4561522B2). In such an auxiliary chamber type internal combustion engine, an air-fuel mixture is formed from a fuel injected into the main chamber. The formed air-fuel mixture is supplied to the auxiliary chamber through the connecting passage at the time of compression, and is ignited by an ignition plug in the auxiliary chamber. Therefore, a flame is formed. The flame formed in the auxiliary chamber is injected into the main chamber through the connecting passage to ignite the air-fuel mixture in the main chamber. In this way, by injecting the flame formed in the auxiliary chamber into the main chamber, a combustion speed of the main chamber is increased. As a result, the engine can be operated at a lower air-fuel ratio, and the fuel efficiency is improved.

JP4561522B2 discloses a technique of shortening a flame propagation distance of the main chamber to further improve thermal efficiency by optimizing orientation directions of a plurality of connecting passages (injection ports) connecting the main chamber and the auxiliary chamber according to a shape of a combustion chamber. In a shape of the combustion chamber having a bowl on a piston crown surface, by providing a first injection port in which a central axis of the injection port is directed to a cylinder inner wall surface, and a second injection port in which a central axis of the injection port is directed to an outer peripheral portion of a bottom surface of the bowl on the piston crown surface when the piston is disposed in the vicinity of a compression top dead center, it is possible to reduce the flame propagation distance over the entire combustion chamber even with a complicated combustion chamber structure.

However, JP4561522B2 proposes that the first injection port and the second injection port are arranged at equal intervals around the central axis of the auxiliary chamber, and are alternately arranged in a circumferential direction. In such a case, the combustion of the air-fuel mixture in a region of the main chamber in a crankshaft direction (a space region S shown in FIG. 2) is slower than that in other regions. If unburned gas remains due to a delay in combustion in the main chamber, there is a possibility that an amount of generated hydrocarbon (HC) and soot increases, and variation may occur in combustion state of the main chamber. This is particularly noticeable in a combustion chamber in which a ridge line is formed on a ceiling of the combustion chamber, such as a so-called pent roof-shaped combustion chamber.

SUMMARY OF INVENTION

Embodiments of the present disclosure relate to an auxiliary chamber type internal combustion engine in which a combustion state of a main chamber is homogenized.

According to an embodiment of the present disclosure, an auxiliary chamber type internal combustion engine includes a main chamber, an auxiliary chamber, a plurality of connecting passages, and an ignition unit. The main chamber is defined by a cylinder, a cylinder head having a plurality of inclined surfaces inclined with respect to a cylinder axial direction, and a piston. The auxiliary chamber protrudes from the cylinder head toward the main chamber and is provided to be separated from the main chamber. The plurality of connecting passages connect the main chamber with the auxiliary chamber. The ignition unit is configured to ignite an air-fuel mixture introduced from the main chamber into the auxiliary chamber through the plurality of connecting passages. The plurality of connecting passages include a first connecting passage and a second connecting passage. The first connecting passage has a first injection port through which a flame generated in the auxiliary chamber by an ignition is injected into the main chamber. The second connecting passage extends in a direction oriented to the piston with respect to the first connecting passage when viewed from a direction perpendicular to the cylinder axial direction, and has a second injection port through which the flame generated in the auxiliary chamber by ignition is injected into the main chamber. The first injection port is configured such that the flame propagates along a ridge line at which the plurality of inclined surfaces of the cylinder head intersect.

In the auxiliary chamber type internal combustion engine, the first injection port of the first connecting passage is configured such that the flame propagates along the ridge line at which the plurality of inclined surfaces of the cylinder head intersect. As a result, the flame reaches a space region in the ridge line direction in the main chamber, and the combustion in this space region is promoted. In addition, the second connecting passage extends in the direction toward the piston from the first connecting passage when viewed from the direction perpendicular to the cylinder axial direction. As a result, the first connecting passage sends out the flame to the upper side of the space region whose distance in the cylinder axial direction is larger than that of other regions, while the second connecting passage sends out the flame to the other regions. Therefore, the combustion state of the entire main chamber is homogenized.

The plurality of inclined surfaces of the cylinder head may have two inclined surfaces forming a pent roof shape, and the first injection port may face in a direction along the ridge line at which the two inclined surfaces intersect with each other.

According to this configuration, even when the main chamber is the pent roof type combustion chamber, the first connecting passage reliably sends out the flame to the region where the space formed by the cylinder head and the piston is the largest. In addition, since the flame immediately after being sent out from the first connecting passage is prevented from directly coming into contact with the cylinder head, the occurrence of heat loss is prevented. As a result, the combustion efficiency in the space region in the crankshaft direction of the main chamber is increased.

The second injection port may face in a direction along the inclined surface when viewed from an extending direction of the ridge line.

According to this configuration, similarly, in the second connecting passage, since the flame immediately after being sent out from the second connecting passage is prevented from directly coming into contact with the cylinder head, the occurrence of heat loss is prevented. As a result, the combustion efficiency in the other space regions of the main chamber is increased, and the combustion state in the main chamber is homogenized evenly.

A center line of the auxiliary chamber may be disposed to be offset from a center line of the main chamber when viewed from the cylinder axial direction, and the first injection port may face in a direction away from an offset direction of the center line of the auxiliary chamber.

According to this configuration, even if the arrangement of the auxiliary chamber is shifted from the center line of the main chamber, the flame sent out from the first connecting passage to the main chamber reaches the space region in the crankshaft direction in the main chamber. As a result, combustion in the space region is promoted.

DESCRIPTION OF EMBODIMENTS

Hereinafter, embodiments of the present disclosure will be described with reference to the drawings. In the following description, a cylinder axial direction Q refers to a direction in which a piston slides along a cylinder. When an upper-lower direction is described as a cylinder axial direction Q, a cylinder head side is referred to as "upper", and a piston side is referred to as "lower". A left-right direction R is orthogonal to the cylinder axial direction Q, and indicates a direction in which an intake port and an exhaust port are disposed. A crankshaft direction P is perpendicular to the cylinder axial direction Q, and indicates a direction in which the cylinder is disposed.

Figure 1:
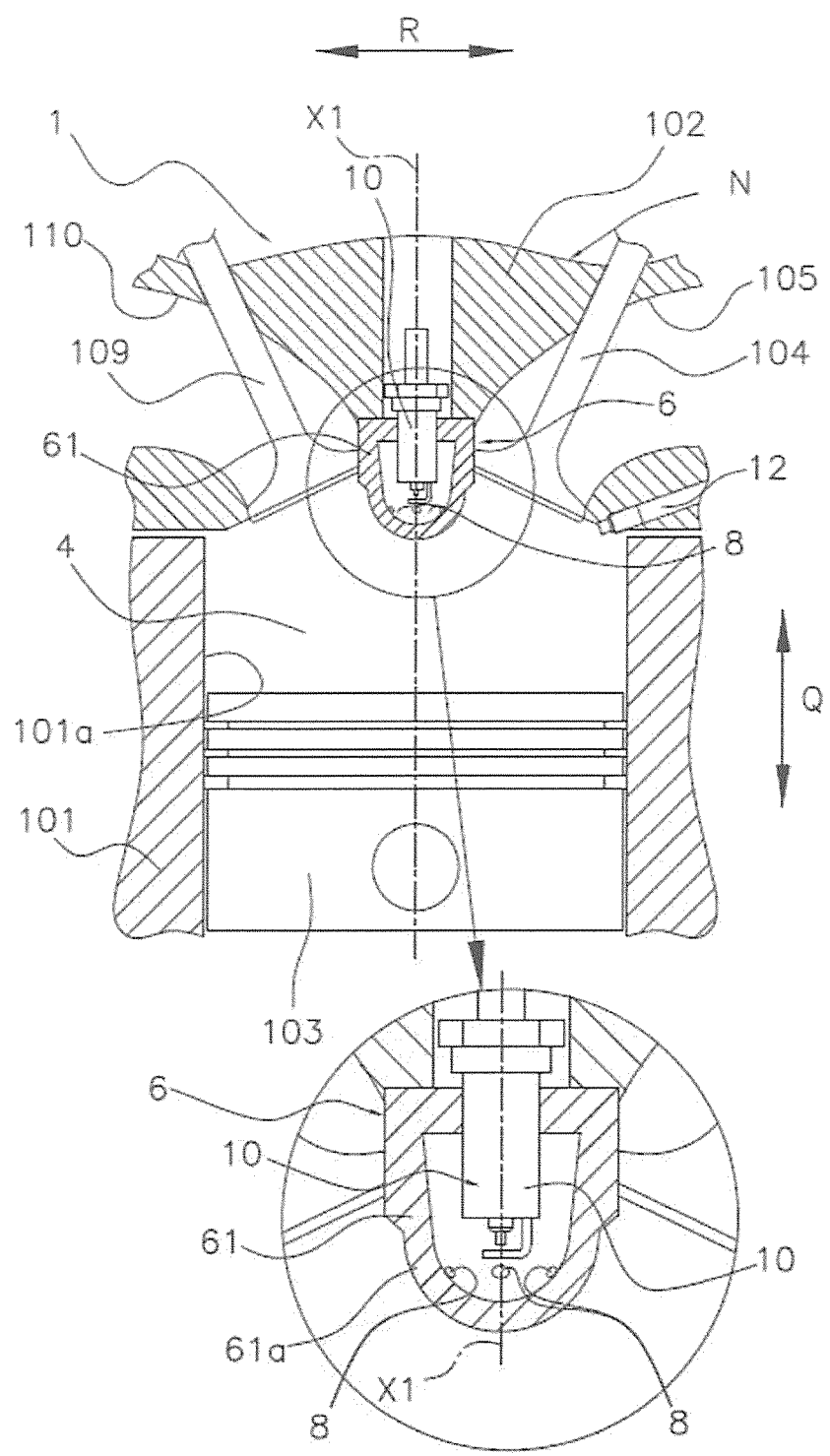
FIG. 1 is a longitudinal sectional view showing a schematic configuration of an auxiliary chamber type internal combustion engine according to an embodiment of the present disclosure.

As shown in FIG. 1, an auxiliary chamber type internal combustion engine 1 includes a main chamber 4, an auxiliary chamber 6 adjacent to the main chamber 4, a plurality of connecting passages 8 that connect the main chamber 4 with the auxiliary chamber 6, an ignition plug (an example of an ignition unit) 10, and a fuel injection valve 12. In the present embodiment, the auxiliary chamber type internal combustion engine 1 is an in-line internal combustion engine in which a plurality of cylinders N including the main chamber 4 and the auxiliary chamber 6 are arranged in series. That is, the main chamber 4, the auxiliary chamber 6, the plurality of connecting passages 8, the ignition plug 10, and the fuel injection valve 12 are provided in each cylinder N. However, the arrangement of the cylinders N is not limited to this, and may be a V-type or a horizontally opposed type.

The main chamber 4 is a space defined by a cylinder 101a of a cylinder block 101, a cylinder head 102, and a piston 103. In the present embodiment, the main chamber 4 has a pent roof shape, and has two inclined surfaces toward an intake port 105 side and an exhaust port 110 side of the cylinder head 102. The main chamber 4 is connected to the intake port 105 via an intake valve 104 driven by an intake cam (not shown). The intake port 105 is connected to an intake passage, a throttle valve, and an air cleaner (not shown). The main chamber 4 is connected to the exhaust port 110, an exhaust passage (not shown), and an exhaust purification catalyst (not shown) via an exhaust valve 109 driven by an exhaust cam (not shown). The piston 103 drives a crankshaft via a connecting rod (not shown).

The auxiliary chamber 6 is provided at the top of the pent roof shape of the main chamber 4, and is adjacent to the main chamber 4. The auxiliary chamber 6 is a space defined by an auxiliary chamber wall 61. The auxiliary chamber 6 protrudes from the cylinder head 102 toward the main chamber 4, and is separated from the main chamber 4 by the auxiliary chamber wall 61. In the present embodiment, the auxiliary chamber 6 is provided substantially at the center of an intersection line (ridge line L) of the two inclined surfaces of the pent roof shape of the main chamber 4. In the present embodiment, the auxiliary chamber 6 has the same center line X1 as the main chamber 4. The auxiliary chamber wall 61 is formed to have a circular cross section and a bottom portion 61a is formed to have a hemispherical shape. A volume of the auxiliary chamber 6 is smaller than that of the main chamber 4, and a flame of an air-fuel mixture ignited by the ignition plug 10 rapidly propagates into the auxiliary chamber 6.

Figure 2:
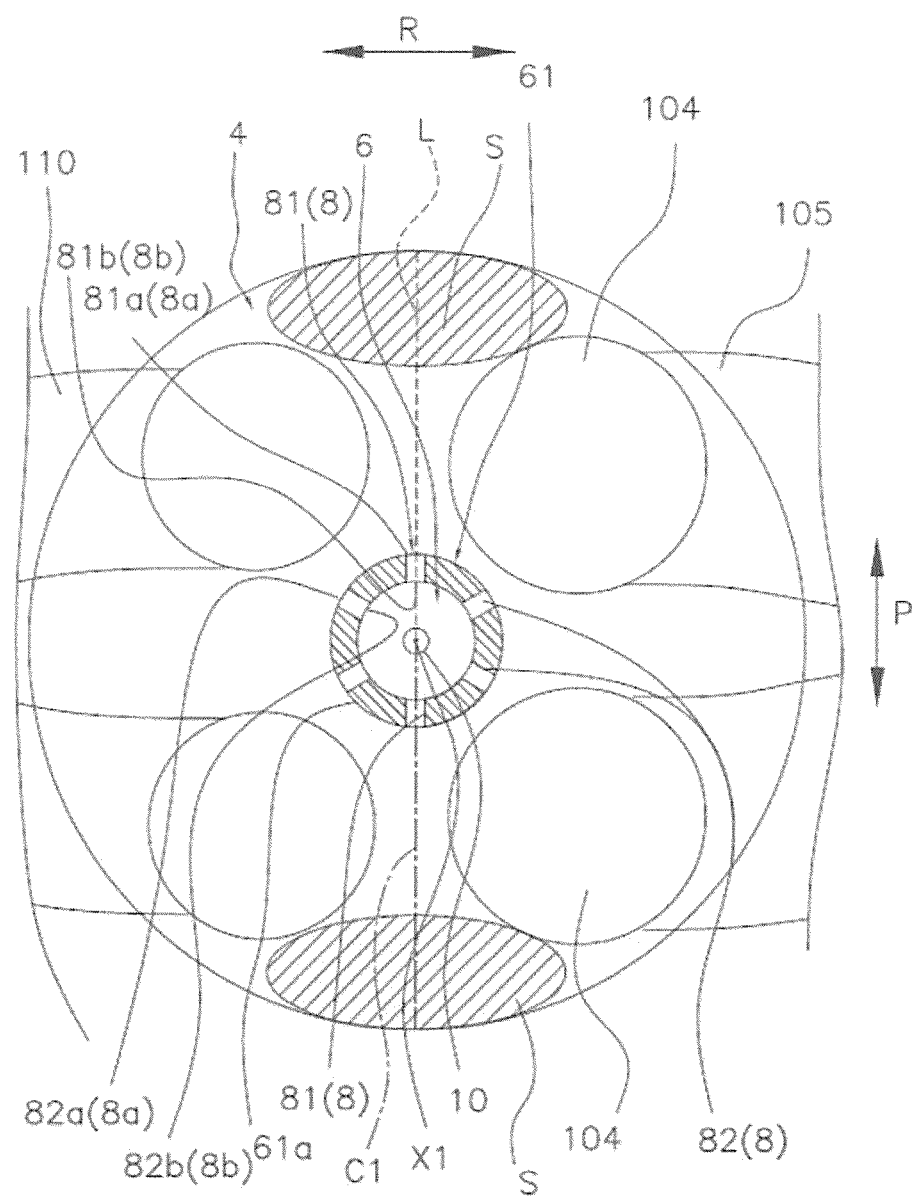
FIG. 2 is a cross-sectional view showing a formation portion of a connecting passage of the auxiliary chamber type internal combustion engine shown in FIG. 1.

A plurality of connecting passages 8 are provided in the bottom portion 61a of the auxiliary chamber wall 61. The connecting passage 8 guides the air-fuel mixture in the main chamber 4 to the auxiliary chamber 6. When the air-fuel mixture introduced into the auxiliary chamber 6 is ignited by the ignition plug 10, the connecting passage 8 sends the flame of the air-fuel mixture in the auxiliary chamber 6 to the main chamber 4. As shown in FIG. 2, the connecting passage 8 has injection ports 8a facing the main chamber 4 on an outer peripheral surface of the auxiliary chamber wall 61, and has introduction ports 8b facing the auxiliary chamber 6 on an inner peripheral surface of the auxiliary chamber wall 61. The connecting passages 8 of the present embodiment includes two first connecting passages 81 provided in the crankshaft direction P and four second connecting passages 82 provided between the two first connecting passages 81.

Figure 3A:
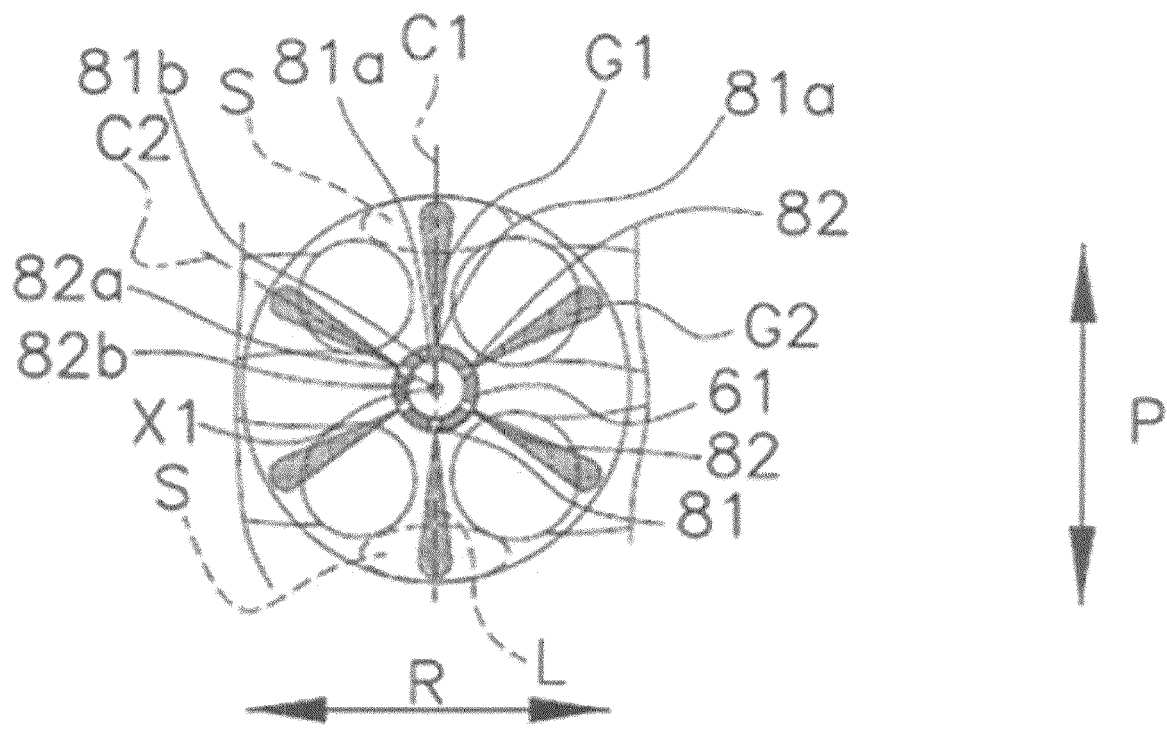
FIG. 3A is a cross-sectional view showing the formation portion of the connecting passage and an injection state of a flame in the auxiliary chamber type internal combustion engine shown in FIG. 1.
Figure 3B:
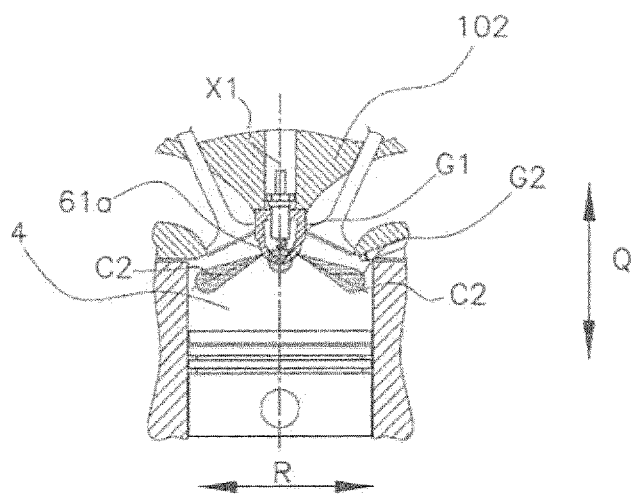
FIG. 3B is a longitudinal sectional view perpendicular to a crankshaft direction showing the formation portion of the connecting passage and the injection state of the flame in the auxiliary chamber type internal combustion engine shown in FIG. 1.
Figure 3C:
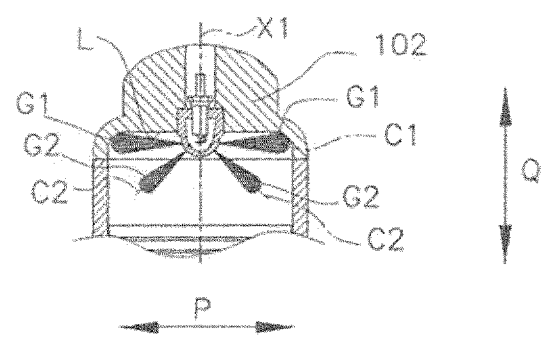
FIG. 3C is a longitudinal sectional view perpendicular to a left-right direction showing the formation portion of the connecting passage and the injection state of the flame in the auxiliary chamber type internal combustion engine shown in FIG. 1.

As shown in FIG. 3A, the first connecting passages 81 are arranged such that, when viewed from the upper-lower direction (the piston 103 side in the cylinder axial direction Q), a flame G1 injected from the injection port (first injection port) 81a overlaps with a ridge line L (an intersection line of two inclined surfaces of the pent roof shape of the main chamber 4) formed on a lower surface (a surface facing the piston 103) of the cylinder head 102, that is, the flame G1 propagates along the ridge line L. As shown in FIGS. 3B and 3C, the first connecting passage 81 are arranged such that, when viewed from the left-right direction R or the crankshaft direction P, the flame G1 is sent out toward a position higher in the upper-lower direction than a flame G2 injected from an injection port (second injection port) 82a of the second connecting passages 82.

In the main chamber 4 of such an auxiliary chamber type internal combustion engine 1, for example, when flames are evenly sent out from the auxiliary chamber 6 to the main chamber 4, the combustion of the air-fuel mixture in a space region S (see FIG. 2) in the crankshaft direction P is slower than that in other regions. That is, when the lower surface of the cylinder head 102 has a pent roof shape, the main chamber 4 has a downward gradient from the center line X1 toward the outer periphery in the left-right direction R. On the other hand, the main chamber 4 does not have such a gradient in the crankshaft direction P. Therefore, there is a large difference in a space volume in the upper-lower direction formed by the cylinder head 102 and the piston 103. That is, the space volume of the space region S having a height in the upper-lower direction is larger than that of the other regions. Therefore, a time until the air-fuel mixture burns in the space region S becomes relatively long. If unburned gas remains due to such a delay in combustion, an amount of generated hydrocarbon (HC) and soot may increase. If the amount of generated HC and soot increases, the combustion state of the main chamber 4 may vary, and the thermal efficiency may decrease.

As shown in FIG. 2, the first connecting passage 81 of the present embodiment includes an injection port 81a and an introduction port 81b. The injection port 81a and the introduction port 81b are provided to face each other on a line radially extending from the center line X1 of the main chamber 4 and the auxiliary chamber 6. An opening area from the injection port 81a to the introduction port 81b is constant. The injection port 81a and the introduction port 81b are provided at the same height. Therefore, a central axis C1 of the first connecting passage 81 extends in the crankshaft direction P passing through the center line X1 and in a direction orthogonal to the upper-lower direction. It is preferable that the central axis C1 is separated from (does not intersect with) the ridge line L in the main chamber 4 in the upper-lower direction. In the present embodiment, when viewed from the upper-lower direction (the piston 103 side in the cylinder axial direction Q), the ridge line L and the central axis C1 overlap each other, and the injection port 81a faces a direction along the ridge line L. As shown in FIGS. 3A and 3C, the first connecting passage 81 injects the flame G1 in a direction along the central axis C1. Therefore, the flame G1 is injected toward the crankshaft direction P of the main chamber 4, that is, toward the space region S having a large space volume. Further, the flame G1 is injected toward the upper side of the space region S in the upper-lower direction (a space that is not present in other regions). Two first connecting passages 81 are provided, and the two first connecting passages 81 are disposed so as to sandwich the auxiliary chamber 6 located substantially at the center of the main chamber 4 along the crankshaft direction P.

As shown in FIG. 3A, when viewed from the upper-lower direction (the piston 103 side in the cylinder axial direction Q), the second connecting passages 82 are arranged such that a flame G2 injected from the injection port 82a is sent out at least in a direction different from that of the first connecting passage 81. In addition, as shown in FIGS. 3B and 3C, the second connecting passages 82 are arranged such that, when viewed from the left-right direction R or the crankshaft direction P, the flame G2 is sent out toward a position lower in the upper-lower direction than the flame G1 injected from the injection port 81a of the first connecting passage 81, that is, the second connecting passages 82 extend in a direction toward the piston 103 than the first connecting passage 81.

As shown in FIG. 2, the second connecting passage 82 of the present embodiment includes an injection port 82a and an introduction port 82b. The injection port 82a and the introduction port 82b are provided to face each other on a line radially extending from the center line X1 of the main chamber 4 and the auxiliary chamber 6. As shown in FIGS. 3B and 3C, an opening area from the injection port 82a to the introduction port 82b is constant. In addition, the injection port 82a is provided at a position lower than the introduction port 82b in the upper-lower direction. Accordingly, a central axis C2 of the second connecting passage 82 passes through the center line X1 and extends in a direction inclined at a predetermined angle with respect to a direction orthogonal to the upper-lower direction. It is preferable that the central axis C2 is separated (does not intersect) from the lower surface of the cylinder head 102 (that is, the inclined surface of the pent roof shape) in the main chamber 4 in the upper-lower direction. In other words, as shown in FIG. 3B, when viewed from an extending direction of the ridge line L, the injection port 82a is preferably directed in a direction along the inclined surface of the pent roof shape. As shown in FIG. 2, four second connecting passages 82 are provided, and the four second connecting passages 82 are disposed at positions that are obtained by equally dividing the same circumference around the auxiliary chamber 6, which is substantially at the center of the main chamber 4, into six equal parts and that are other than the positions in the crankshaft direction P where the two first connecting passages 81 are disposed. As shown in FIGS. 3A to 3C, the second connecting passage 82 injects the flame G2 in a direction along the central axis C2. Therefore, the flame G2 is uniformly injected toward the left-right direction R of the main chamber 4, that is, toward a region different from the space region S. The second connecting passage 82 may be further disposed below the first connecting passage 81. In this case, the flame G1 promotes combustion in the upper region with respect to the space region S having a large space volume, while the flame G2 promotes combustion in the lower region.

The ignition plug 10 is disposed at the center line X1 of the auxiliary chamber 6. The ignition plug 10 ignites the air-fuel mixture in the auxiliary chamber 6.

As shown in FIG. 1, the fuel injection valve 12 is provided toward the main chamber 4. The fuel injection valve 12 is provided outside the auxiliary chamber 6. In the present embodiment, the fuel injection valve 12 injects fuel directly into the main chamber 4. That is, the auxiliary chamber type internal combustion engine 1 is a direct-injection internal combustion engine. An injection amount and an injection timing of the fuel injection valve 12 are controlled by a control unit (not shown). The fuel injection valve 12 is connected to a fuel injection pump (not shown) and a fuel tank (not shown). The fuel injection valve 12 is disposed on the intake valve 104 side of the cylinder head 102. In the present embodiment, a target air-fuel ratio is set to a value leaner than the stoichiometric air-fuel ratio. That is, the auxiliary chamber type internal combustion engine 1 is operated by lean combustion. As a result, the fuel efficiency is improved.

In the auxiliary chamber type internal combustion engine 1 configured as described above, in an intake stroke, the intake valve 104 opens, the piston 103 descends, and the intake air flows into the main chamber 4 and the auxiliary chamber 6. In the present embodiment, the intake air is pressurized by a supercharger (not shown). As a result, the pressures of the main chamber 4 and the auxiliary chamber 6 become equal to the pressure of the intake air. In the intake stroke, the fuel injection valve 12 is controlled so as to mainly perform fuel injection for supplying fuel to the main chamber 4. The injected fuel mixes with the intake air to form the air-fuel mixture in the main chamber 4. As the piston 103 moves downward, the air-fuel mixture is supplied to the entire main chamber 4.

In a compression stroke, the intake valve 104 is closed, the piston 103 moves upward, and the air-fuel mixture in the main chamber 4 is compressed. At this time, the pressure in the main chamber 4 increases. In the compression stroke, when the piston 103 moves upward, the air-fuel mixture is introduced from the main chamber 4 into the auxiliary chamber 6 via the connecting passages 8. At this time, the air-fuel mixture is introduced into the auxiliary chamber 6 by the connecting passages 8.

When the piston 103 moves upward and the compression further proceeds, the air-fuel mixture in the auxiliary chamber 6 is ignited by the ignition plug 10. Along with the combustion in the auxiliary chamber 6, the flame G (flame G1, flame G2) is injected into the main chamber 4 through the connecting passages 8 (first connecting passages 81, second connecting passages 82). Then, the air-fuel mixture in the main chamber 4 is combusted, and the pressure is increased by the combustion gas generated by the combustion. As a result, the piston 103 is pushed down and proceeds to an expansion stroke.

In the present embodiment, the first connecting passages 81 reliably send out the flame G1 toward the space region S in which the space volume in the upper-lower direction is largest and the combustion is likely to be unbalanced. In addition, the first connecting passages 81 are provided such that the flame G1 immediately after the injection does not hit the cylinder head 102 to cause heat loss, and the flame G1 is injected toward the upper side of the space region S. Further, similarly to the first connecting passages 81, the second connecting passages 82 are provided such that the flame G2 immediately after injection does not hit the cylinder head 102 to cause heat loss, and the flame G2 is injected to the other regions. As a result, the combustion in the main chamber 4 is uniform.

In an exhaust stroke, the exhaust valve 109 opens, the piston 103 moves upward from the bottom dead center, and the combustion gas (exhaust gas) in the cylinder is discharged to the exhaust port 110. When the piston 103 reaches the top dead center, the intake stroke starts again. When the piston 103 reciprocates twice in this manner, the four strokes are completed.

As described above, in the auxiliary chamber type internal combustion engine 1 according to the present embodiment, the first connecting passages 81 are configured such that the flame G1 injected from the first connecting passages 81 into the main chamber 4 propagates along the ridge line L formed on the lower surface (the surface facing the piston 103) of the cylinder head 102. As a result, the flame G1 reaches the space region S in the crankshaft direction P of the cylinder 101a in the main chamber 4, and combustion in the space region S is promoted. In addition, the second connecting passages 82 are located below the first connecting passages 81 in the cylinder axial direction Q (in a direction toward the piston 103) and extend in a direction different from that of the first connecting passages 81 when viewed from the cylinder axial direction Q. As a result, the first connecting passages 81 send out the flame G1 to the space region S whose distance in the cylinder axial direction Q is larger than that of the other regions while the second connecting passages 82 send out the flame G2 to the other regions Therefore, the combustion state of the main chamber 4 is homogenized.

Other Embodiments

Although the embodiment of the present disclosure has been described above, the present disclosure is not limited to the above-described embodiment, and various modifications can be made without departing from the gist of the invention. In particular, a plurality of modifications described in the present specification can be optionally combined as necessary.

In the embodiment described above, the auxiliary chamber type internal combustion engine 1 is a direct-injection internal combustion engine, but the present disclosure is not limited thereto. For example, the internal combustion engine may be an auxiliary chamber type internal combustion engine including an intake port injector provided in the intake port 105.

Figure 4A:
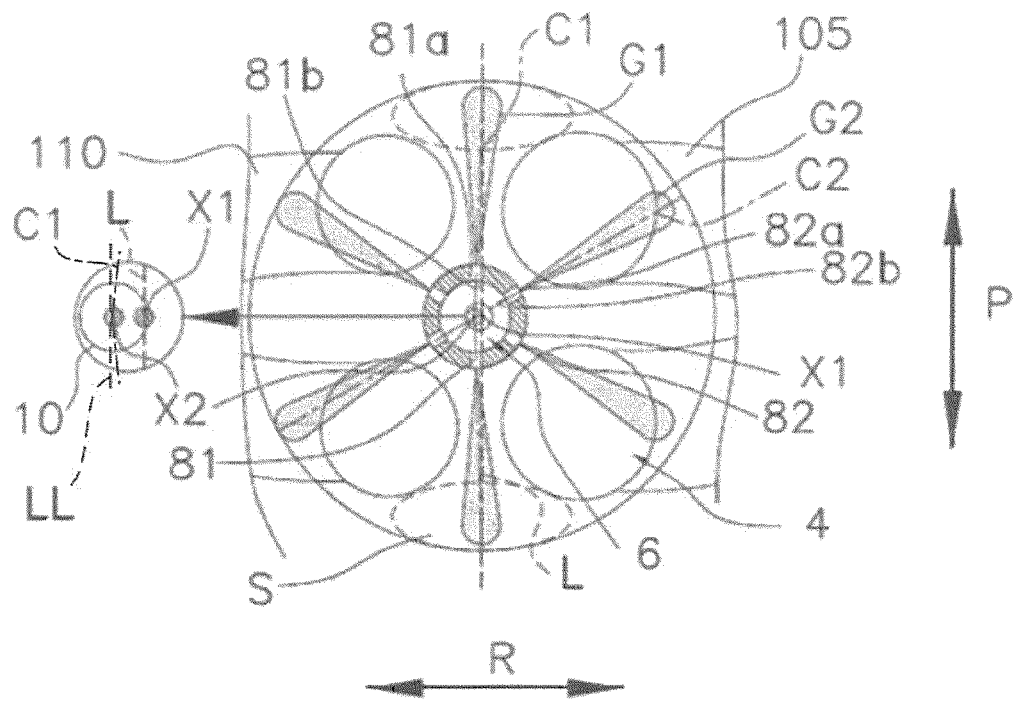
FIG. 4A is a cross-sectional view showing a formation portion of a connecting passage of an auxiliary chamber type internal combustion engine according to another embodiment of the present disclosure in a case where an auxiliary chamber is offset toward an exhaust port side.
Figure 4B:
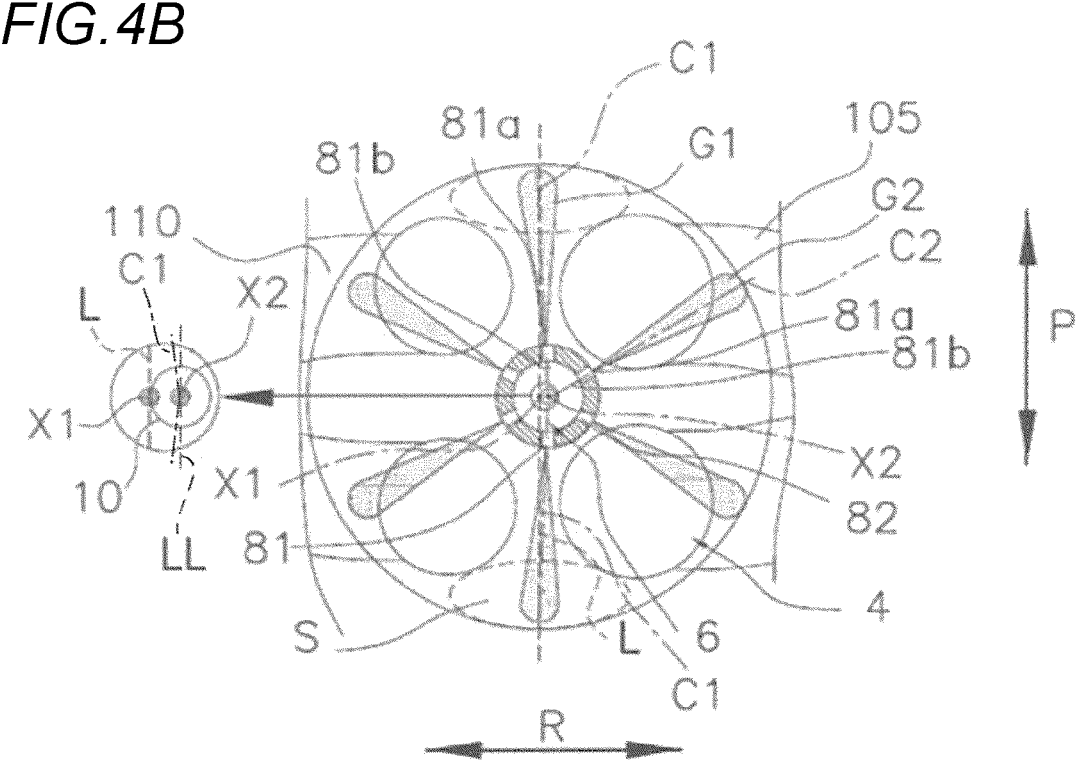
FIG. 4B is a cross-sectional view showing the formation portion of the connecting passage of the auxiliary chamber type internal combustion engine according to the other embodiment of the present disclosure in a case the auxiliary chamber is offset toward an intake port side.

In the embodiment described above, the auxiliary chamber 6 is provided at the center line X1 the same as the main chamber 4, but the present disclosure is not limited thereto. For example, as shown in FIG. 4A and FIG. 4B in an enlarged manner, the auxiliary chamber 6 may be provided at a center line X2 offset in a direction intersecting the ridge line L from the center line X1 of the main chamber 4 toward an inner wall surface of the cylinder 101a. As shown in FIGS. 4A and 4B, in such a case, when viewed from the upper-lower direction, the injection port 81a and the introduction port 81b are disposed such that the central axis C1 of the first connecting passage 81 extending from the center line X2 approaches the ridge line L passing through the center line X1. Specifically, when viewed from the upper-lower direction, the central axis C1 of the first connecting passage 81 is inclined toward the ridge line L with respect to a straight line LL that passes through the center line X2 offset from the center line X1 in a direction intersecting the ridge line L and extends parallel to the ridge line L. An inclination angle of the central axis C1 changes according to the offset amount. As shown in FIG. 4A, when the auxiliary chamber 6 is offset toward the exhaust port 110 (see the enlarged view of FIG. 4A), the central axis C1 of the first connecting passage 81 is inclined toward the intake port 105 with respect to the straight line LL passing through the center line X2. In this case, the injection port 81a is provided closer to the intake side with respect to the introduction port 81b.

As shown in FIG. 4B, when the auxiliary chamber 6 is offset toward the intake port 105 (see the enlarged view of FIG. 4B), the central axis C1 of the first connecting passage 81 is inclined toward the exhaust port 110 with respect to the straight line LL passing through the center line X2. In this case, the injection port 81a is provided closer to the exhaust port 110 with respect to the introduction port 81b. According to this configuration, even if the arrangement of the auxiliary chamber 6 is shifted from the center line of the main chamber 4, the flame G1 sent out from the first connecting passages 81 to the main chamber 4 reaches the center of the space region S in the crankshaft direction P in the main chamber 4. As a result, combustion in the space region S is promoted.

Figure 5A:
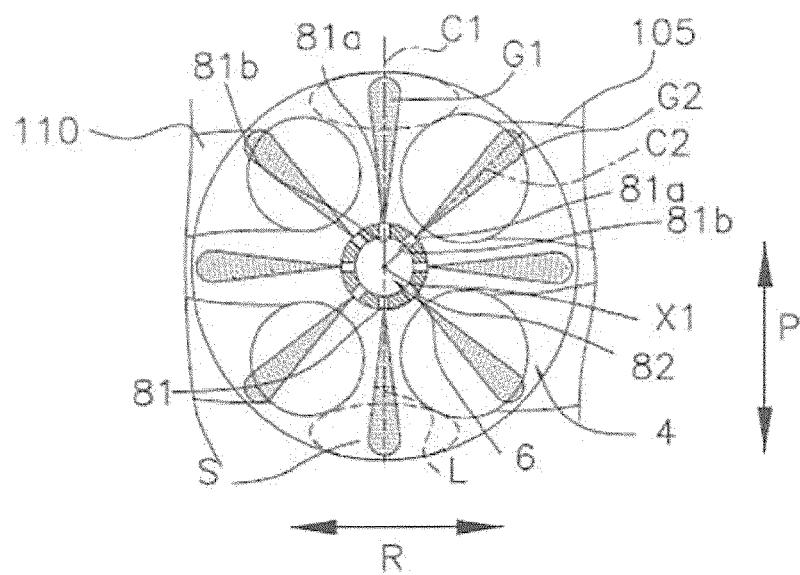
FIG. 5A is a cross-sectional view showing a second connecting passage of the auxiliary chamber type internal combustion engine according to the other embodiment of the present disclosure.
Figure 5B:
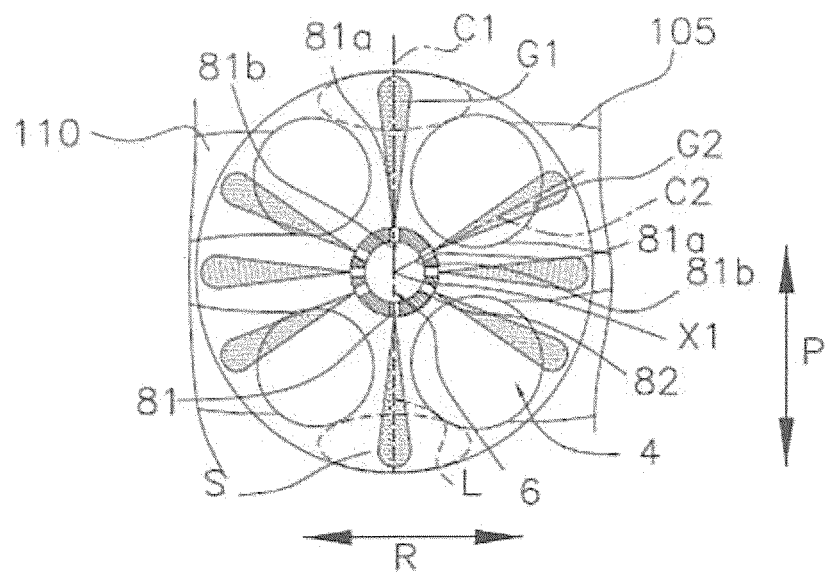
FIG. 5B is a cross-sectional view showing the second connecting passage of the auxiliary chamber type internal combustion engine according to the other embodiment of the present disclosure.

In the embodiment described above, four second connecting passages 82 are provided, but the present disclosure is not limited thereto. For example, six second connecting passages 82 may be provided as shown in FIGS. 5A and 5B. As shown in FIG. 5A, the second connecting passages 82 may be disposed at positions that are obtained by equally dividing the same circumference around the auxiliary chamber 6, which is substantially at the center of the main chamber 4, into eight equal parts and that are other than the positions in the crankshaft direction P where the two first connecting passages 81 are disposed. Further, as shown in FIG. 5B, in the above-described embodiment, one second connecting passage 82 may be further added between two second connecting passages 82 arranged on the left side and between two second connecting passages 82 arranged on the right side, separately. According to this configuration, combustion in the main chamber 4 is further promoted.

In the embodiment described above, the shape of the auxiliary chamber is exemplified by a shape (a hemispherical shape, a cylindrical shape, or the like) in which a cross section taken along a plane perpendicular to the cylinder axial direction is circular. However, the shape of the auxiliary chamber is not limited thereto. The cross section may have a shape of an ellipse or a regular polygon. From the viewpoint of flame propagation, a symmetrical shape is preferable, but the shape is not limited thereto. It should be noted that geometric expressions such as "diameter direction", "radial direction", and "tangent line" in the present disclosure can be appropriately understood by those skilled in the art even when the cross section is not circular. That is, even in an embodiment in which the cross section of the auxiliary chamber is other than a circular shape, a person skilled in the art will be able to appropriately apply the features of the present disclosure so as to achieve the same effects as those of the present disclosure.

According to an embodiment of the present disclosure, an auxiliary chamber type internal combustion engine (1) includes:

a main chamber (4) defined by a cylinder (101a), a cylinder head (102) having a plurality of inclined surfaces inclined with respect to a cylinder axial direction (Q), and a piston (103);

an auxiliary chamber (6) protruding from the cylinder head (102) toward the main chamber (4) and provided to be separated from the main chamber (4);

a plurality of connecting passages (8) connecting the main chamber (4) with the auxiliary chamber (6); and an ignition unit (10) configured to ignite an air-fuel mixture introduced from the main chamber (4) into the auxiliary chamber (6) through the plurality of connecting passages (8), in which the plurality of connecting passages (8) include:

a first connecting passage (81) having a first injection port (81a) through which a flame generated in the auxiliary chamber (6) by an ignition is injected into the main chamber (4); and a second connecting passage (82) extending in a direction oriented to the piston (103) with respect to the first connecting passage (81) when viewed from a direction perpendicular to the cylinder axial direction (Q), and having a second injection port (82a) through which the flame is injected into the main chamber (4), and the first injection port (81a) is configured such that the flame propagates along a ridge line (L) at which the plurality of inclined surfaces of the cylinder head (102) intersect.

The plurality of inclined surfaces of the cylinder head (102) may have two inclined surfaces forming a pent roof shape, and the first injection port (81a) may face in a direction along the ridge line (L) at which the two inclined surfaces intersect with each other.

The second injection port (82a) may face in a direction along the inclined surface when viewed from an extending direction of the ridge line (L).

A center line (X2) of the auxiliary chamber may be disposed to be offset from a center line (X1) of the main chamber when viewed from the cylinder axial direction (Q), and the first injection port (81a) may face in a direction away from an offset direction of the center line (X2) of the auxiliary chamber.

The present application is based on Japanese Patent Application No. 2019-061132 filed on Mar. 27, 2019, the contents of which are incorporated herein as reference.

REFERENCE SIGNS LIST

1: auxiliary chamber type internal combustion engine
4: main chamber
6: auxiliary chamber
8: connecting passage
81: first connecting passage
81a: injection port
82: second connecting passage
82a: injection port
10: ignition plug (ignition unit)
61: auxiliary chamber wall
101a: cylinder
102: cylinder head
103: piston
C1: central axis
C2: central axis
X1: center line of main chamber
X2: center line of auxiliary chamber
L: ridge line
Q: cylinder axial direction

The invention claimed is:

1. An auxiliary chamber type internal combustion engine comprising:

a main chamber defined by a cylinder, a cylinder head having a plurality of inclined surfaces inclined with respect to a cylinder axial direction, and a piston;

an auxiliary chamber protruding from the cylinder head toward the main chamber and provided to be separated from the main chamber;

a plurality of connecting passages connecting the main chamber with the auxiliary chamber; and an ignition unit configured to ignite an air-fuel mixture introduced from the main chamber into the auxiliary chamber through the plurality of connecting passages, wherein a center line of the auxiliary chamber is disposed to be offset from a center line of the main chamber when viewed from the cylinder axial direction, wherein the plurality of connecting passages include:
- a first connecting passage having a first injection port through which a flame generated in the auxiliary chamber by ignition is injected into the main chamber; and
- a second connecting passage extending in a direction oriented to the piston with respect to the first connecting passage when viewed from a direction perpendicular to the cylinder axial direction, and having a second injection port through which the flame is injected into the main chamber, wherein the first injection port and the second injection port are provided on a line radially extending, wherein a central axis of the first connecting passage having the first injection port is oriented in a direction away from an offset direction of the center line of the auxiliary chamber, such that the injected flame propagates to a space region in a crankshaft direction of the main chamber in which a ridge line at which the plurality of inclined surfaces of the cylinder head intersect extends.

2. The auxiliary chamber type internal combustion engine according to claim 1, wherein the plurality of inclined surfaces of the cylinder head have two inclined surfaces forming a pent roof shape, wherein a central axis of the first connecting passage overlaps the ridge line at which the plurality of inclined surfaces intersect when viewed from cylinder axial direction, and wherein the first injection port faces in a direction along the ridge line at which the two inclined surfaces intersect with each other.

3. The auxiliary chamber type internal combustion engine according to claim 1, wherein the second injection port faces in a direction along the inclined surface when viewed from an extending direction of the ridge line.

* * * * *